(12) United States Patent
Meyvaert

(10) Patent No.: US 11,515,784 B2
(45) Date of Patent: Nov. 29, 2022

(54) CIRCUITS FOR SWITCHED CAPACITOR VOLTAGE CONVERTERS

(71) Applicant: Lion Semiconductor Inc., San Francisco, CA (US)

(72) Inventor: Hans Meyvaert, Leuven (BE)

(73) Assignee: Lion Semiconductor Inc., San Francisco, CA (US)

( * ) Notice: Subject to any disclaimer, the term of this patent is extended or adjusted under 35 U.S.C. 154(b) by 51 days.

(21) Appl. No.: 17/212,566

(22) Filed: Mar. 25, 2021

(65) Prior Publication Data

US 2021/0305894 A1 Sep. 30, 2021

Related U.S. Application Data

(60) Provisional application No. 63/000,428, filed on Mar. 26, 2020.

(51) Int. Cl.
*H02M 3/07* (2006.01)

(52) U.S. Cl.
CPC ..................... *H02M 3/07* (2013.01)

(58) Field of Classification Search
CPC ....... H02M 3/07; H02M 3/072; H02M 1/0043
See application file for complete search history.

(56) References Cited

U.S. PATENT DOCUMENTS

| | | | | |
|---|---|---|---|---|
| 9,882,471 | B2 * | 1/2018 | Giuliano | H02M 3/158 |
| 2009/0278520 | A1 * | 11/2009 | Perreault | H02M 3/07 |
| | | | | 323/282 |
| 2012/0299642 | A1 * | 11/2012 | Hamada | G11C 5/145 |
| | | | | 327/536 |
| 2016/0126834 | A1 * | 5/2016 | Lesso | H02M 3/07 |
| | | | | 327/536 |
| 2016/0308443 | A1 * | 10/2016 | Crossley | H02M 3/158 |
| 2019/0073949 | A1 | 3/2019 | Zhang | |
| 2019/0252974 | A1 | 8/2019 | Meyvaert et al. | |

OTHER PUBLICATIONS

International Search Report and Written Opinion dated Jun. 29, 2021 in International Patent Application No. PCT/US2021/024091, pp. 1-17.

* cited by examiner

*Primary Examiner* — Sibin Chen
(74) *Attorney, Agent, or Firm* — Byrne Poh LLP

(57) ABSTRACT

A circuit comprising: a first switch having: a first side connected to a first node; and a second side connected to a second capacitor's first side (2C1S); a second switch having: a first side connected to a second capacitor's second side (2C2S); and a second side connected to a first capacitor's first side (1C1S); a third switch having: a first side connected to a first capacitor's second side (1C2S); and a second side connected to a second node (2VN); a fourth switch having: a first side connected to 2C2S; and a second side connected to a third node (3VN); a fifth switch having: a first side connected to 2C1S; and a second side connected to 1C1S; a sixth switch having: a first side connected to 1C2S; and a second side connected to 3VN; a seventh switch having: a first side connected to 1C1S; and a second side connected to 2VN.

14 Claims, 4 Drawing Sheets

_US 11,515,784 B2_

CIRCUITS FOR SWITCHED CAPACITOR VOLTAGE CONVERTERS

CROSS-REFERENCE TO RELATED APPLICATION

This application claims the benefit of U.S. Provisional Patent Application No. 63/000,428, filed Mar. 26, 2020, which is hereby incorporated by reference herein in its entirety.

BACKGROUND

Switched capacitor voltage converters are convenient circuits for converting one DC voltage level to another. For example, in some embodiments, such voltage converters can be used to charge batteries in mobiles devices. As such, there is a very large need for switched capacitor voltage converters.

Accordingly, new and improved switched capacitor voltage converters are desirable.

SUMMARY

In accordance with some embodiments, circuits for switched capacitor voltage converters are provided.

In some embodiments, circuits for switched capacitor voltage converters are provided, the switches comprising: a first capacitor having a first side and a second side; a second capacitor having a first side and a second side; a first switch having a first side connected to a first voltage node and having a second side connected to the first side of the second capacitor; a second switch having a first side connected to the second side of the second capacitor and having a second side connected to the first side of the first capacitor; a third switch having a first side connected to the second side of the first capacitor and having a second side connected to a second voltage node; a fourth switch having a first side connected to the second side of the second capacitor and having a second side connected to a third voltage node; a fifth switch having a first side connected to the first side of the second capacitor and having a second side connected to the first side of the first capacitor; a sixth switch having a first side connected to the second side of the first capacitor and having a second side connected to the third voltage node; and a seventh switch having a first side connected to the first side of the first capacitor and having a second side connected to the second voltage node.

In some of these embodiments, the third voltage node is connected to ground.

In some of these embodiments, during a first configuration: the first switch is closed; the second switch is closed; the third switch is closed; the fourth switch is open; the fifth switch is open; the sixth switch is open; and the seventh switch is open.

In some of these embodiments, during a second configuration: the first switch is open; the second switch is open; the third switch is closed; the fourth switch is closed; the fifth switch is closed; the sixth switch is open; and the seventh switch is open.

In some of these embodiments, during a third configuration: the third switch is open; the sixth switch is closed; and the seventh switch is closed.

In some of these embodiments, during the third configuration: the first switch is open; the second switch is open; the third switch is open; the fourth switch is closed; the fifth switch is open; the sixth switch is closed; and the seventh switch is closed.

In some of these embodiments, during the third configuration: the first switch is open; the second switch is open; the third switch is open; the fourth switch is open; the fifth switch is open; the sixth switch is closed; and the seventh switch is closed.

In some of these embodiments, during the third configuration: the first switch is open; the second switch is closed; the third switch is open; the fourth switch is open; the fifth switch is open; the sixth switch is closed; and the seventh switch is closed.

In some of these embodiments, during the third configuration: the first switch is open; the second switch is open; the third switch is open; the fourth switch is open; the fifth switch is closed; the sixth switch is closed; and the seventh switch is closed.

In some of these embodiments, during the third configuration: the first switch is closed; the second switch is open; the third switch is open; the fourth switch is open; the fifth switch is open; the sixth switch is closed; and the seventh switch is closed.

In some of these embodiments, the circuit rotates through the first configuration, the second configuration, and the third configuration in the following order: the first configuration; the second configuration; and the third configuration.

In some of these embodiments, the circuit rotates through the first configuration, the second configuration, and the third configuration in the following order: the first configuration; the third configuration; and the second configuration.

In some of these embodiments, the first switch, the second switch, the third switch, the fourth switch, the fifth switch, the sixth switch, and the seventh switch are formed from MOSFETs.

In some of these embodiments, the first voltage node receives an input voltage and the second voltage node outputs an output voltage.

In some of these embodiments, the second voltage node receives an input voltage and the first voltage node outputs an output voltage.

In some of these embodiments, the circuit is used to form a multi-phase voltage converter.

DETAILED DESCRIPTION

Figure 1:
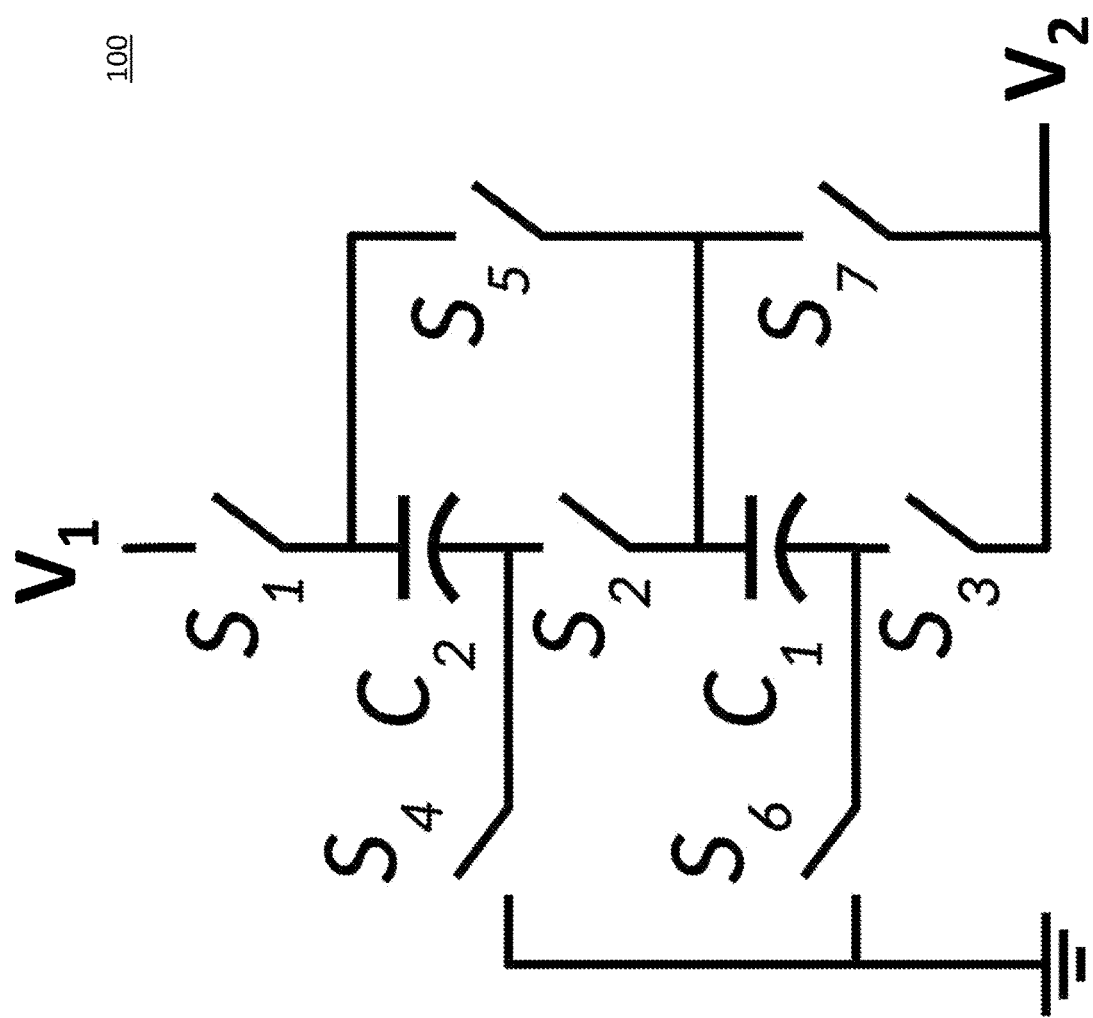
FIG. 1 shows an example schematic of a circuit for a switched capacitor voltage converter in accordance with some embodiments.

Turning to FIG. 1, an example 100 of a circuit for a switched capacitor voltage converter in accordance with some embodiments is shown. As illustrated, circuit 100 includes two capacitors, $C_1$ and $C_2$, and seven switches, $S_1$, $S_2$, $S_3$, $S_4$, $S_5$, $S_6$, and $S_7$. As also illustrated, the circuit has nodes labelled $V_1$ and $V_2$. In some embodiments, $V_1$ is an input node that is connected to a voltage source, $V_2$ is an output node that is connected to a load, and circuit 100 provides an output voltage at $V_2$ that is one quarter of the input voltage at $V_1$. In other embodiments, $V_2$ is an input node that is connected to a voltage source, $V_1$ is an output node that is connected to a load, and circuit 100 provides an output voltage at $V_1$ that is four times the input voltage at $V_2$.

Any suitable capacitors can be used for capacitors $C_1$ and $C_2$ in some embodiments. For example, in some embodiments, the capacitors can be formed on chip or can be discrete components.

Capacitors $C_1$ and $C_2$ can have any suitable values in some embodiments. For example, in some embodiments, the capacitors can have values between 1 nF and 1 mF.

Any suitable switches can be used for switches $S_1$, $S_2$, $S_3$, $S_4$, $S_5$, $S_6$, and $S_7$. For example, in some embodiments, the switches can be formed from MOSFETs that are driven by any suitable drivers under the control of any suitable circuit.

Figure 2:
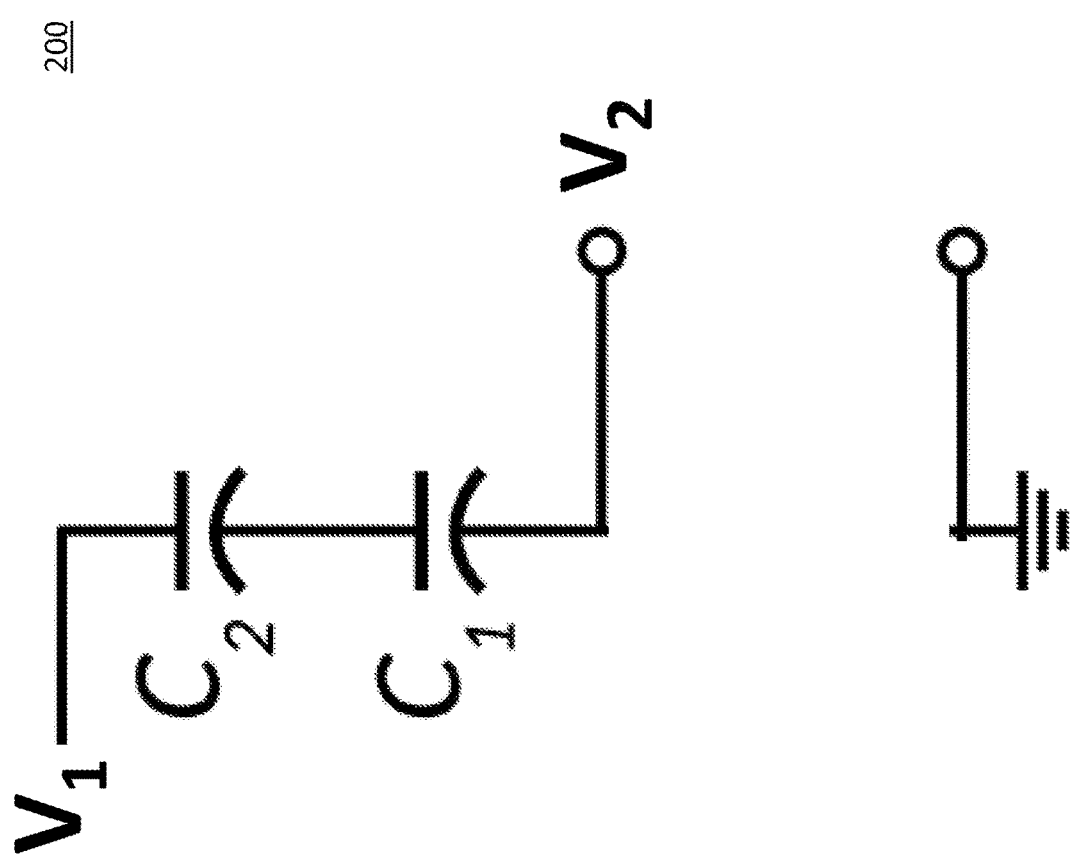
FIG. 2 shows an example schematic of the circuit for a switched capacitor voltage converter of FIG. 1 in a first configuration in accordance with some embodiments.
Figure 3:
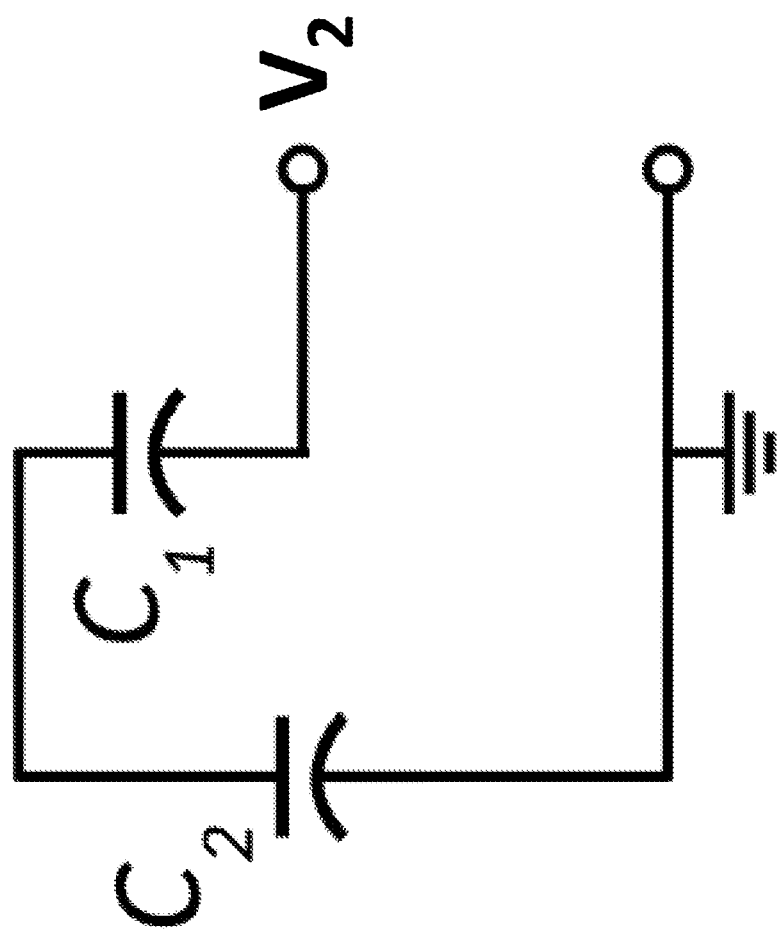
FIG. 3 shows an example schematic of the circuit for a switched capacitor voltage converter of FIG. 1 in a second configuration in accordance with some embodiments.
Figure 4:
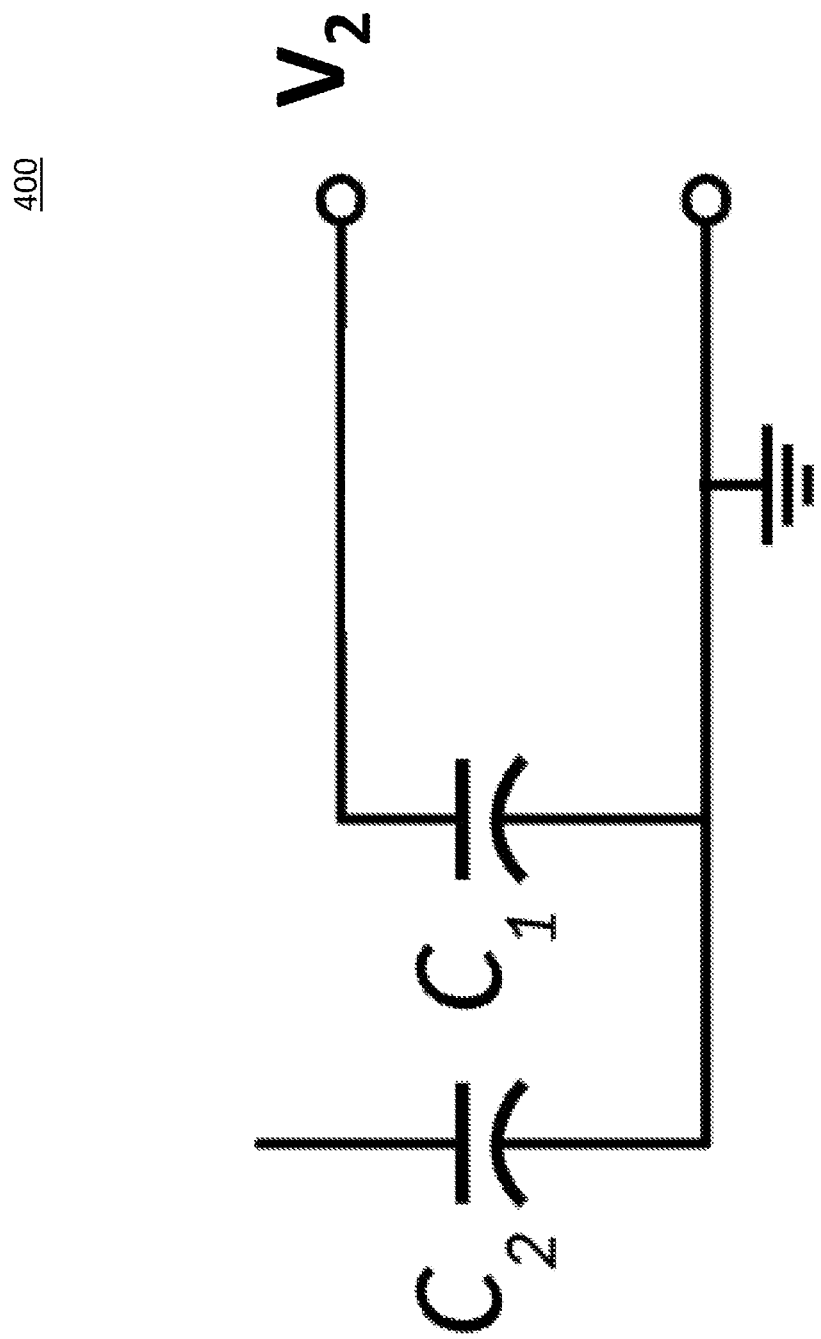
FIG. 4 shows an example schematic of the circuit for a switched capacitor voltage converter of FIG. 1 in a third configuration in accordance with some embodiments.

During operation, the switches of circuit 100 can be opened and closed to sequentially form circuit configurations 200, 300, and 400 shown in FIGS. 2, 3, and 4, respectively. Circuit 100 can rotate through configuration 200, 300, and 400 in any suitable order. For example, in some embodiments: immediately after being in configuration 200, circuit 100 can configured to be in configuration 300; immediately after being in configuration 300, circuit 100 can be configured to be in configuration 400; and immediately after being in configuration 400, circuit 100 can be configured to be in configuration 200. As another example, in some embodiments: immediately after being in configuration 200, circuit 100 can be configured to be in configuration 400; immediately after being in configuration 400, circuit 100 can be configured to be in configuration 300; and immediately after being in configuration 300, circuit 100 can be configured to be in configuration 200.

During operation, circuit 100 can rotate through the three configurations at any suitable frequency. For example, in some embodiments, the circuit can rotate through the three configurations at frequencies between 1 kHz (e.g., for 1 mF capacitor sizes) and 1 GHz (e.g., for 1 nF capacitor sizes).

The following table shows the settings of switches $S_1$, $S_2$, $S_3$, $S_4$, $S_5$, $S_6$, and $S_7$ when in configurations 200, 300, and 400:

| Switch | Configuration 200 | Configuration 300 | Configuration 400 |
| --- | --- | --- | --- |
| $S_1$ | Closed | Open | Open* |
| $S_2$ | Closed | Open | Open* |
| $S_3$ | Closed | Closed | Open |
| $S_4$ | Open | Closed | Closed* |
| $S_5$ | Open | Closed | Open* |
| $S_6$ | Open | Open | Closed |
| $S_7$ | Open | Open | Closed |

*Other configurations of these switches are possible in configuration 400 as long as: at least one side of capacitor C2 is disconnected from the remainder of the circuit, $S_1$ and $S_5$ are not closed at the same time, and $S_2$ and $S_4$ are not closed at the same time.

In some embodiments, circuit 100 can be used to form a multi-phase voltage converter. In such an implementation, multiple copies of circuit 100 can be provided and their input and output nodes connected together (i.e., the $V_1$ connections of all of the circuits 100 are connected together and the $V_2$ connections all of the circuits 100 are connected together). In some embodiments, the switches of different circuits can be switched out of phase so that different circuits 100 switch from one configuration to another at different times. In some embodiments, two different circuits 100 of such a multi-phase voltage converter can be configured to be in different configurations at all points in time.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A circuit for a switched capacitor voltage converter, comprising:
    a first capacitor having a first side and a second side;
    a second capacitor having a first side and a second side;
    a first switch having a first side connected to a first voltage node and having a second side connected to the first side of the second capacitor;
    a second switch having a first side connected to the second side of the second capacitor and having a second side connected to the first side of the first capacitor;
    a third switch having a first side connected to the second side of the first capacitor and having a second side connected to a second voltage node;
    a fourth switch having a first side connected to the second side of the second capacitor and having a second side connected to a third voltage node;
    a fifth switch having a first side connected to the first side of the second capacitor and having a second side connected to the first side of the first capacitor;
    a sixth switch having a first side connected to the second side of the first capacitor and having a second side connected to the third voltage node; and
    a seventh switch having a first side connected to the first side of the first capacitor and having a second side connected to the second voltage node,
    wherein, during a first configuration:
        the first switch is closed;
        the second switch is closed;
        the third switch is closed;
        the fourth switch is open;
        the fifth switch is open;
        the sixth switch is open; and
        the seventh switch is open, and
    wherein, during a second configuration:
        the first switch is open;
        the second switch is open;
        the third switch is closed;
        the fourth switch is closed;
        the fifth switch is closed;
        the sixth switch is open; and
        the seventh switch is open.

2. The circuit of claim 1, wherein the third voltage node is connected to ground.

3. The circuit of claim 1, wherein, during a third configuration:
    the third switch is open;
    the sixth switch is closed; and
    the seventh switch is closed.

4. The circuit of claim 3, wherein, during the third configuration:
    the first switch is open;
    the second switch is open;
    the third switch is open;
    the fourth switch is closed;
    the fifth switch is open;

the sixth switch is closed; and
the seventh switch is closed.

5. The circuit of claim 3, wherein, during the third configuration:
the first switch is open;
the second switch is open;
the third switch is open;
the fourth switch is open;
the fifth switch is open;
the sixth switch is closed; and
the seventh switch is closed.

6. The circuit of claim 3, wherein, during the third configuration:
the first switch is open;
the second switch is closed;
the third switch is open;
the fourth switch is open;
the fifth switch is open;
the sixth switch is closed; and
the seventh switch is closed.

7. The circuit of claim 3, wherein, during the third configuration:
the first switch is open;
the second switch is open;
the third switch is open;
the fourth switch is open;
the fifth switch is closed;
the sixth switch is closed; and
the seventh switch is closed.

8. The circuit of claim 3, wherein, during the third configuration:
the first switch is closed;
the second switch is open;
the third switch is open;
the fourth switch is open;
the fifth switch is open;
the sixth switch is closed; and
the seventh switch is closed.

9. The circuit of claim 3, wherein the circuit rotates through the first configuration, the second configuration, and the third configuration in the following order: the first configuration; the second configuration; and the third configuration.

10. The circuit of claim 3, wherein the circuit rotates through the first configuration, the second configuration, and the third configuration in the following order: the first configuration; the third configuration; and the second configuration.

11. The circuit of claim 1, wherein the first switch, the second switch, the third switch, the fourth switch, the fifth switch, the sixth switch, and the seventh switch are formed from MOSFETs.

12. The circuit of claim 1, wherein the first voltage node receives an input voltage and the second voltage node outputs an output voltage.

13. The circuit of claim 1, wherein the second voltage node receives an input voltage and the first voltage node outputs an output voltage.

14. The circuit of claim 1, wherein the circuit is used to form a multi-phase voltage converter.

\* \* \* \* \*